United States Patent [19]

Lutz et al.

[11] Patent Number: 4,870,133

[45] Date of Patent: Sep. 26, 1989

[54] POLYMER BLEND OF POLYKETONE POLYMERS WITH TETRAFLUOROETHYLENE

[75] Inventors: Robert G. Lutz, Santa Rosa, Calif.; William P. Gergen, Houston, Tex.

[73] Assignee: Shell Oil Company, Houston, Tex.

[21] Appl. No.: 287,942

[22] Filed: Dec. 16, 1988

[51] Int. Cl.$^4$ .............................................. C08G 63/62
[52] U.S. Cl. .................................. 525/185; 525/539; 528/392
[58] Field of Search ................. 525/185, 539; 528/392

[56] References Cited

U.S. PATENT DOCUMENTS

| 2,495,286 | 1/1950 | Brubaker | 260/63 |
| 2,946,763 | 7/1960 | Bro et al. | 260/45.5 |
| 2,955,099 | 10/1960 | Mallouk et al. | 260/45.7 |
| 3,264,272 | 8/1966 | Rees | 260/78.5 |
| 3,404,134 | 10/1968 | Rees | 260/78.5 |
| 3,655,611 | 4/1972 | Mueller et al. | 260/42.18 |
| 3,694,412 | 9/1972 | Nozaki | 260/63 |
| 4,795,810 | 1/1989 | Harris | 528/370 |
| 4,816,529 | 3/1989 | Harris | 525/453 |

FOREIGN PATENT DOCUMENTS

| 121965 | 10/1984 | European Pat. Off. . |
| 181014 | 5/1986 | European Pat. Off. . |
| 1081304 | 8/1967 | United Kingdom . |

Primary Examiner—Harold D. Anderson
Assistant Examiner—T. Mason
Attorney, Agent, or Firm—Dean F. Vance

[57] ABSTRACT

Polymer blends comprising a major proportion of a linear alternating polymer of carbon monoxide and at least one ethylenically unsaturated hydrocarbon and a minor proportion of a tetrafluoroethylene containing polymer exhibit good melt strength.

12 Claims, No Drawings

POLYMER BLEND OF POLYKETONE POLYMERS WITH TETRAFLUOROETHYLENE

FIELD OF THE INVENTION

This invention relates to an improved polymer blend comprising predominantly a linear alternating polymer of carbon monoxide and at least one ethylenically unsaturated hydrocarbon. More particularly, the invention relates to blends of the linear alternating polymer with a fluorocarbon or fluoroplastic copolymer that contains tetrafluoroethylene.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. Pat. No. 1,081,304 produced similar polymers of higher carbon monoxide content in the presence of alkylphosphine complexes of palladium salts as catalyst. Nozaki extended this process to produce linear alternating polymers by the use of arylphosphine complexes of palladium moieties and certain inert solvents. See, for example, U.S. Pat. No. 3,694,412.

More recently, the class of linear alternating polymers of carbon monoxide has become of greater interest in part because of the greater availability of the polymers. These polymers, also known as polyketones or polyketone polymers, have been shown to be of the repeating formula —CO—A—where A is the moiety of unsaturated hydrocarbon polymerized through the ethylenic unsaturation. For example, when the hydrocarbon is ethylene, the polymer is represented by the repeating formula —CO—CH$_2$—CH$_2$—. The general process for the more recent production of such polymers is illustrated by a number of published European Patent Applications including 121,965 and 181,014. The process typically involves a catalyst composition formed from a compound of a Group VIII metal selected from palladium, cobalt or nickel, the anion of a strong non-hydrohalogenic acid and a bidentate ligand of phosphorus, arsenic or antimony.

The resulting polymers are relatively high molecular weight thermoplastics having established utility in the production of shaped articles such as containers for food and drink and internal and external parts for automotive applications, which articles are produced by processing the polymer according to known methods such as extrusion, injection molding and thermoforming. For some particular applications it has been found desirable to have properties for a polymeric composition which are somewhat different from those of the polyketone polymer. It would be of advantage to retain the more desirable physical properties of the polyketone polymers and yet improve other properties. These advantages are often obtained through the provision of a polymer blend.

SUMMARY OF THE INVENTION

The present invention contemplates the provision of blends of linear alternating polymer of carbon monoxide and at least one ethylenically unsaturated hydrocarbon and certain other polymeric material. More particularly, according to the invention, there are provided blends of the linear alternating polymer with fluorocarbon or fluoroplastic copolymers that contain tetrafluoroethylene. A small amount of an acid polymer or a fatty acid stearate is added as a processing aid. Such blends are characterized by good melt strength.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other alpha-olefins including propylene, 1-butene, isobutylene, 1-hexene, 1-octene and 1-dodecene or are arylaliphatic containing an aromatic substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon of at least 3 carbon atoms, particularly an alpha-olefin such as propylene.

The structure of the polyketone polymer is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed, there will be within the terpolymer at least two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain is therefore represented by the repeating formula

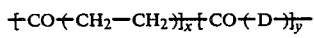

where D is the moiety obtained by polymerization of the second hydrocarbon through the ethylenic unsaturation. The —CO—CH$_2$—CH$_2$— units and the —CO—D— are found randomly throughout the polymer chain and the ratio of y:x is no more than about 0.5. In the modification of the invention where copolymers of carbon monoxide and ethylene are employed as a blend component there will be no second hydrocarbon present and the polymer is represented by the above formula wherein y0. When y is other than 0, i.e., terpolymers are employed, ratios of y-x from about 0.01 to about 0.1 are preferred. The end groups or "caps" of the polymer chain will depend on what materials are present during the production of the polymer and whether and how the polyketone is purified. The precise properties of the polymer will not depend upon the particular end groups to any considerable extent so that the polymer is fairly depicted by the above formula for the polymer chain. Of particular interest are the polymers of molecular weight from about 1,000 to about 200,000, particularly those of molecular weight from about 20,000 to about 90,000 as determined by gel permeation chromatography. The physical properties of the polymers will depend in part on the molecular weight, whether the polymer is a copolymer or a terpolymer and, in the case of terpolymers, the proportion of the second hydrocarbon present. Typical melting points of such polymers are from about 175° C. to about 300° C., more frequently from about 210° C. to about 270° C. The polymers will have a limiting viscosity number (LVN), measured in a standard capillary viscosity measuring device in m-cresol at 60° C., from about 10, preferably from about 0.8 to about 4.

A method of producing the polymers which is now becoming conventional is to contact the carbon monoxide and unsaturated hydrocarbon(s) in the presence of a palladium compound, the anion of a non-hydrohalogenic acid having a pKa below about 6 and a bidentate phosphorus ligand. The scope of the process for polyketone production is extensive, but, without wishing to be limited, a preferred palladium compound is a palladium carboxylate, particularly palladium acetate, a preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process is illustrated by copending U.S. patent application Ser. No. 930,468, filed Nov. 14, 1986 (Docket No. K-0722).

Polymerization is conducted in a gas phase or in a liquid phase in the presence of an inert diluent such as a lower alkanol, e.g., methanol or ethanol. The reactants are contacted under polymerization conditions in the presence of the catalyst composition and reactant contact is maintained by conventional methods such as shaking or stirring in a suitable reaction vessel. Typical reaction temperatures are from about 20° C. to about 150° C. with preferred reaction temperatures being from about 50° C. to about 135° C. Suitable reaction pressures are from about 1 bar to about 200 bar, more often from about 10 bar to about 100 bar. Subsequent to reaction the polymer product is recovered by conventional methods such as filtration or decantation. The polymer product may contain residues of the catalyst composition which are removed, if desired, by treatment of the polymer product with a solvent or an extraction agent which is selective for the residues.

The minor component of the blends of the invention are fluorocarbon or fluoroplastic polymers of tetrafluoroethylene and at least one other monomer selected from a group consisting of and hexafluoropropylene, perfluoroalkoxy monomers, and ethylene. Such copolymers are known in the art, and are commercially available although the method of their production is proprietary. In general, the tetrafluoroethylene/hexafluoropropylene copolymers are produced by an emulsion polymerization process in the presence of a free radical initiator such as ammonium persulfate. Such a process is described by Bro et al, U.S. Pat. No. 2,946,763, by Mallouk et al, U.S. Pat. No. 2,955,099, and by Mueller et al, U.S. Pat. No. 3,655,611, incorporated herein by reference. The perfluoroalkoxy monomers have the general formula:

$$CF_2=CF-OR_f$$

wherein $R_f$ is a fluorinated alkyl group, preferably a fluorinated ethyl group ($-C_2F_5$). Tetrafluoroethylene/ethylene/propylene terpolymers are commercially available from DuPont under the trademark TEFZEL ® fluoropolymer resins. The tetrafluoroethylene polymers in general are characterized by good tensile strength and thermal stability and have a high crystalline melting point.

The blends of the invention comprise a mixture of a major proportion of the polyketone polymer and a minor proportion of the tetrafluoroethylene polymer. The precise proportion of the tetrafluoroethylene polymer is not critical and amounts of from about 0.5% by weight to about 35% by weight, based on total blend, should be satisfactory, preferably amounts of from about 1% by weight to about 25% by weight.

Processing of the blend is facilitated by addition of less than 5%, preferably less than about 1%, by weight of an acid polymer or a fatty acid stearate such as glycerol monostearate. The acid polymer is preferably an α-olefin unsaturated carboxylic acid polymer. The acid polymer may be a partial non-alkali metal salt of an α-olefin/unsaturated carboxylic acid polymer. By the term partial non-alkali metal salt is meant that some but not all of the carboxylic acid moieties have been neutralized with zinc, aluminum, or magnesium as further discussed below. Because the partially neutralized material retains ionic character while being polymeric in form, the material is often referred to as a metal ionomer.

The α-olefin component of the acid polymer is preferably an α-olefin of up to 10 carbon atoms inclusive such as ethylene, propylene, 1-butene, 1-octene and 1-decene. Preferred α-olefins are straight chain α-olefins of up to 4 carbon atoms inclusive and particularly preferred is ethylene. The α-olefin component of the partially neutralized polymer is present in at least 80% by mol, based on the total base polymer, i.e., the non-neutralized polymer, and preferably present in at least 90% by mol on the same basis.

The unsaturated carboxylic acid component of the acid polymer is preferably an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which, methacrylic acid is preferred. The unsaturated carboxylic acid monomer content of the acid polymers is from about 1% by mol to about 20% by mol based on the base or non-neutralized polymer. Amounts of carboxylic acid from about 9% by mol to about 15% by mol on the same basis are preferred. Certain of these acid polymers are commercially available and are marketed under the trademarks PRIMACOR acid polymers and NUCREL acid polymers.

The metal ionomer is produced by reacting the α-olefin/unsaturated carboxylic acid polymer with a source of the ionizable metal compound sufficient to neutralize from about 10% to about 90% of the carboxylic acid groups present in the polymer. Such neutralization with ionizable zinc, which is the preferred metal, results in a uniform distribution of zinc throughout the polymer. Neutralization of from about 20% to about 80% of the carboxylic acid groups is preferred and neutralization of from about 35% to about 75% of the carboxylic acid groups is particularly preferred. The metal ions suitably employed in the partial neutralization are uncomplexed non-alkali metal ions including zinc ions, aluminum ions, and magnesium ions which are provided in compounds of the type often referred to as metal salts, e.g., zinc chloride, zinc acetate and zinc formate, or are complexed metal ions wherein the metal is bonded to two types of groups, at least one of which is readily ionized from the metal and the other is not. Illustrative of such complexed metal ions are mixed zinc salts with one weak acid such as oleic acid or stearic acid and one more ionizable acid such as acetic acid or formic acid. In general, neutralization with a complexed zinc ion is most preferred. Methods of producing the metal ionomers are known in the art and are disclosed in U.S. Pat. No. 3,264,272 and U.S. Pat. No. 3,404,134 which are incorporated herein by reference. Certain of these partially neutralized polymers, i.e., the metal ionomers, are commercially available and are marketed under the trademark SURLYN ® by DuPont.

The method of producing the blend of the polyketone polymer and the tetrafluoroethylene copolymer is not material as long as a relatively uniform distribution of the fluorinated copolymer throughout the polyketone polymer is obtained. The blend is a non-miscible blend with the fluorinated copolymer existing as a discrete phase in the polyketone matrix with a phase size on the order of from about 1 micron to about 3 microns. The blend will not, therefore, be homogeneous but the distribution of the fluorine-containing copolymer phase throughout the polyketone polyner matrix will be substantially uniform. The methods of blending the components are methods which are conventional for the blending of non-miscible polymeric materials. In one modification, the blend components in particulate form are uniformly mixed and the mixture is passed through an extruder to produce the blend as an extrudate. In an alternate modification the components are blended in a mixing device which exhibits high shear.

The blends of the invention may also include conventional additives such as antioxidants, stabilizers, fillers, fire resistant materials, mold release agents and other substances which are added to increase the processability of the polymers or modify the properties of the resulting blend. Such additives are added by conventional methods prior to, together with or subsequent to the blending of the polyketone polymer and the tetrafluoroethylene copolymer.

The blends are processed by means of the usual techniques such as extrusion or injection molding into sheets, plates, fibers, films and shaped articles useful in applications such as packaging, production of shaped parts for automotive applications and structural parts for utilization in the construction industry.

The invention is further illustrated by the following Illustrative Embodiments which should not be construed as limiting.

COMPARATIVE EXAMPLE I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 230° C. and the polymer had a limiting viscosity number (LVN) of 1.69 when measured in m-cresol at 60° C. A small amount of IRGANOX 1076, a conventional hindered phenolic antioxidant, was added as a stabilizer.

The terpolymer was extruded in a twin screw Baker Perkins extruder at 272° C. and 300 rpm then injection molded at 275° C. and 650 psi for measurement of impact strength. The molded sample had a notched Izod impact strength of 4.9 ft. lbs/in.

ILLUSTRATIVE EMBODIMENT I

A molded sample of a blend of the polyketone polymer of Comparative Example I and 20% by weight (based on total blend) of DuPont's TEFZEL-200, a tetrafluoroethylene/ethylene/propylene terpolymer was produced with the same procedure as described in Comparative Example I except that 1% by weight of SURLYN 9520 was added as a processing aid and 0.5% by weight of ETHANOX 330 was added as an antioxidant. The polymer blend exhibited good melt strength in comparison to the polymer of Comparative Example I. The molded sample had a notched Izod impact strength of 3.5 ft. lbs/in and was easy to mold.

What is claimed is:

1. A composition comprising a non-miscible blend of, as a major component, a linear alternating copolymer of carbon monoxide and at least one ethylenically unsaturated hydrocarbon, and, as a minor component, a polymer of tetrafluoroethylene and at least one other monomer selected from a group consisting of hexafluoropropylene, perfluoroalkoxy monomers, and ethylene.

2. The composition of claim 1 wherein the linear alternating polymer is represented by the formula

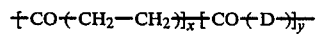

wherein D is the moiety of an ethylenically unsaturated hydrocarbon of at least 3 carbon atoms polymerized through the ethylenic unsaturation and the ratio of y:x is no more than about 0.5.

3. The composition of claim 2 wherein the tetrafluoroethylene is polymerized with ethylene and propylene.

4. The composition of claim 3 wherein the tetrafluoroethylene/ethylene/propylene polymer is present in a quantity of from about 0.5% by weight to about 35% by weight, based on the total blend.

5. The composition of claim 4 wherein y is zero.

6. The composition of claim 4 wherein D is a moiety of propylene.

7. The composition of claim 6 wherein the ratio of y:x is from about 0.01 to about 0.1.

8. The composition of claim 1 further comprising a processing aid in an amount less than 5% by weight of the composition.

9. The composition of claim 8 wherein the processing aid is an acid polymer present in an amount less than about 1% by weight of the composition.

10. A polymer composition produced by the process of:
polymerizing a linear alternating polyketone from carbon monoxide and at least one ethylenically unsaturated hydrocarbon in the presence of a catalyst composition comprising a palladium compound, an anion of a nonhydrohalogenic acid having a pka below about 6, and a bidentate ligand of phosphorous; and
blending the polyketone with a lesser amount of a polymer comprising tetrafluoroethylene and at least one other monomer selected from a group consisting of hexafluoropropylene, perfluoroalkoxy monomer, and ethylene.

11. The polymer composition of claim 10 wherein the polyketone and the polymer containing tetrafluoroethylene are melt blended.

12. The polymer composition of claim 10 wherein the bidentate ligand is 1,3-bis[di(2-methoxyphenyl)phosphino]propane.

* * * * *